United States Patent [19]
Torcol et al.

[11] 3,818,110
[45] June 18, 1974

[54] METHOD OF PRODUCING KOLA NUT EXTRACT

[75] Inventors: Jean V. Torcol, Paris; Denis J. Dessolin, Nogent-sur-Marne, both of France

[73] Assignee: Institut pour La Technologie et l'Industrialisation des Produits Agricoles Tropicaux, Abidjan, France

[22] Filed: June 9, 1971

[21] Appl. No.: 151,570

[30] Foreign Application Priority Data
June 11, 1970 France .............................. 70.21440

[52] U.S. Cl. ................................. 426/44, 426/229
[51] Int. Cl. ............................................... A23l 1/36
[58] Field of Search ...................... 260/236.5–236.6, 42.2; 99/17, 22

[56] References Cited
UNITED STATES PATENTS
3,525,626   8/1970   Swaine et al........................... 99/78

FOREIGN PATENTS OR APPLICATIONS
907,055     3/1954   Germany ............................ 99/22 X
1,568,185   4/1969   France................................. 99/22 X
961,022     3/1957   Germany ............................ 99/22 X

*Primary Examiner*—Raymond N. Jones
*Attorney, Agent, or Firm*—Weiner, Basile and Weintraub

[57] ABSTRACT

This method of producing a complete stabilized extract of fresh kola nuts having a high caffeine content associated with useful substances such as alcaloids and phenol compounds, consists in washing with pure water at about 75°C during a few minutes grated kiola nuts immediately after the fragmentation thereof to destroy the oxidases, then cooling the macerated product to at least 50°C and bringing the pH value to about 5, filtering, washing and then, at about 25°C, sowing the liquid with yeasts to effect the alcohol fermentation, distilling and concentrating the filtrate in vacuo.

4 Claims, No Drawings

METHOD OF PRODUCING KOLA NUT EXTRACT

BACKGROUND OF THE INVENTION

This invention relates to methods of obtaining complete stabilized extracts of fresh kola nuts having a high combined caffeine content.

The stimulating action exerted on the human organism by fresh kola nuts is well known. Unfortunately, the extract production processes used up to now lead as a rule to oxidized products which are thus deprived of the greater part of their physiological value. In fact, fresh kola nuts contain oxidases which cause a nearly instantaneous oxidation of the cells contacting the atmosphere when these nuts are fragmented. Fragmentation is definitely necessary for preparing extracts, and therefore the destruction by oxidation of the active principles seems to be unavoidable.

On the other hand, many studies and research works made on kola products proved that its beneficial action was due not only to its caffeine content but also and more particularly to the combined form in which this caffeine is present therein, as it constitutes an unstable association of alcaloids and phenol compounds.

Under these conditions it would appear that a satisfactory extract of fresh kola nuts should be:

1. Perfectly stabilized by the elimination of oxidases from the very nut fragmentation;
2. Complete, i.e., contain all the substances associated with caffeine in fresh kola nuts.

In hitherto known methods of preparing kola nut extract the purpose was mainly to obtain a satisfactory yield of total caffeine, without consideration of the caffeine condition (i.e., whether it was free or combined). In fact, since in these former processes the caffeine is mostly found in its free condition, the value of these extracts is not definitely greater than that of a product obtained by using synthetic caffeine. This may account notably for the fact that in certain well-known beverages of the so-called "kola-containing" type the kola extract is simply replaced by synthetic caffeine.

The conventional methods of extracting kola by using solvents have undoubtedly been improved (cf. German Pat. Nos. 907,055 and 961,022) by endeavoring to increase yields through the enzymic degradation of the kola nut starch content, and possibly by fermenting the resulting sugars. However, these improved yields are definitely not attended by qualitative improvements, for instance as measurable from the proportion of combined caffeine. In fact, the treatments proposed in these prior art methods include operations such as the torrefaction of the kola nuts, the prolonged boiling thereof in the presence of beer wort, etc. Now these treatments are strictly inconsistent with the preservation of the fragile and thermolabile association of alcaloids and phenol compounds constituting the chief interest of fresh kola nut.

SUMMARY OF THE INVENTION

The present invention is directed to a method adapted to meet the twofold requirement of obtaining a stabilized product containing the caffeine in its combined form with active substances.

With the method of this invention it is possible to obtain at will either an extract titrating about 6 percent of total caffeine or an extract titrating at least 10 percent of total caffeine. In either case, the proportion of combined caffeine is about 80 percent.

The total caffeine content is calculated according to the Codex method and the combined caffeine content is calculated according to the Griffon, Perronet and Verbaut method (cf. Ann. Pharm. May 1952 TX 321, Paris).

DESCRIPTION OF THE PREFERRED EMBODIMENT

The method of this invention is characterized essentially by the following points:

1. The oxidases are destroyed immediately after the fragmentation of the fresh kola nuts, by maceration in pure water or the wash water from a preceding operation for only a few minutes at a temperature of 75°C which is all that is necessary and sufficient for destroying the oxidases.
2. All the subsequent operations are carried out in such a manner as to prevent the product temperature from overstepping the 50°C limit.
3. The resulting extract is concentrated in vacuo and then kept at a temperature of about 40°C for about 1 hour, before drying the extract. With this step the alcaloids phenol compounds association which might have been partially broken during the extraction steps proper is restored.

The method of this invention comprises the following sequence of steps:

I. The fresh kola nuts are grated and the grated product is immersed in pure water (or wash water from a preceding operation) heated to 75°C. The grated nuts are kept at this temperature for 15 minutes for destroying the natural nut oxidases. Furthermore, an amylase of group B is added to the macerated product for starting the saccharification of starch as the oxidase destruction proceeds.

II. The macerated product is drained and pressed, thus yielding:
   a. a first pressure juice, which is treated as explained hereinabove,
   b. a cake subsequently lixiviated in water and then pressed again for yielding wash water to be used in the next operation.

III. The first pressure juice is cooled to 55°C and its pH value brought to 4.5 to 5 by adding citric acid, whereafter an amylase of group F (Fungicide) is left in contact therewith until the red color disappears in the presence of iodine.

IV. The kola-containing liquid thus obtained is sown with yeasts (preferably S. ellipsoideus or oviformis) and subjected to an alcohol fermentation at a temperature of the order of about 25°C for 36 hours. Upon completion of the fermentation step the liquid is filtered to remove the yeasts therefrom.

V. The filtrate is distilled in vacuo to recover the alcohol produced by the fermentation, then concentrated in vacuo until a dry extract content of about 28 percent is obtained.

At this stage two procedures may be adhered to:

A. Cooling the concentrate while stirring to about 4°C, then drying the product by low-temperature atomization. Thus, a pinky powder is obtained which contains all the active principles of kola nuts in their original condition, with a total caffeine content of about 6 percent, of which about 80 percent is in the combined form.

B. Cooling the concentrate while stirring to about 4°C and centrifugating same at this temperature. The cooling step is attended by an insolubilization of the alcaloid/phenol compounds complex or association. The liquid phase is atomized and thus a powder having a caffeine content of 5.5 percent to 75 percent in the combined form is obtained.

The sediment is dissolved and stirred in water at 50°C, then cooled to 4°C. It is kept for 1 hour at this temperature and eventually dried by atomization. Thus, a powder having a total caffeine content of about 13 percent (of which about 80 percent in the combined form) is obtained. Thus, by mixing the products obtained according to stages A and B described hereinabove it is possible to prepare extracts having exactly the desired content, between 6 and 13 percent.

It is sometimes advantageous, notably for preparing food products (such as beverages, kola-containing chocolate, etc.) to obtain an extract having a lower caffeine concentrate percentage but containing the sugars from the starch saccharification process. In this case, it is only necessary to concentrate the so-called first-pressure juice without resorting to a preliminary fermentation, and to subsequently cool the product to 4°C and atomize the concentrate.

The above-described method is illustrated by the following two Examples:

EXAMPLE 1

I. 10 kg of fresh kola nuts containing 1.82 percent of total caffeine calculated on the dry material, corresponding to 47.58 percent, are grated and then immersed in 25 litres of wash water from a preceding operation which was heated to 75°C. The mix is enzymated with 60 g of amylase from group B, and stirred while preventing the temperature from dropping below 75°C until the violet color disappears in the presence of iodine. The combined operation consisting in destroying the oxidases and saccharifying the product takes about 15 minutes.

II. The mix is allowed to drain on a sieve, the volume thus collected is 22.8 litres and titrates 10° Brix. Then the residual cake is pressed, the total volume of the so-called first pressure juice is 26.8 litres and titrates 10° Brix.

The residual cake is lixiviated in 25 litres of water heated to 50°C, and then drained and pressed again. Thus, 23.8 litres of a so-called "wash water from a preceding operation," titrating 2°5 Brix are obtained, together with 6.250 kg of purified cake containing 0.43 percent of total caffeine calculated on the percentage of dry substance which is 38.24 percent.

III. The first pressure juice is cooled while stirring to a temperature of 55°C, and then 25 g of citric acid are added to obtain a pH value of 4.8. Then 10 g of an amylase from group F are added. The temperature is allowed to drop to 50°C and the assembly is still stirred until the red iodine color disappears. This operation lasts about 50 minutes.

IV. The mix is cooled to 25°C, sown with a sediment previously prepared from a selected strain, for example saccharomyces oviformis. The fermentation is allowed to proceed until the density of the fermented liquid is stabilized. The density is 1,009 at 20°C. This operation takes about 36 hours.

The product is centrifugated for recovering the yeasts which may be used for sowing a subsequent operation, and the fermented juice is sifted through a Kieselguhr alluviated sieve. Thus, 26.2 kg of bright juice titrating 6.6 percent of total caffeine calculated on the dry substance are obtained.

V. The fermented juice is concentrated in vacuo. Thus, 20 litres of a condensate titrating 3.10 percent of alcohol is obtained and then distilled to yield 1.400 litres of aqua vitae titrating 43 percent of alcohol, i.e., 602 c.c. of pure alcohol and 5.42 Kg of concentrate at 28° Brix titrating 6.2 percent of caffeine in relation to the dry substance representing 22.6 percent.

At this stage two procedures may be adhered to:

A. One-half of this concentrate is cooled to about 4°C and then atomized. The concentrated product is left at this temperature while stirring during 1 hour. After the atomization step, 610 g of powder denoted CTR containing 96 percent of dry substance and titrating 6.45 percent of total caffeine in relation to the dry substance, of which 78 percent are available in the combined form, are obtained.

B. The other half, i.e., 2.71 kg, is cooled while stirring to 4°C and kept under these process conditions for 1 hour, then centrifugated at the same temperature. Thus, 2,410 g of supernatant are collected and atomized. The powder thus obtained (denoted CTS) weighs 420 g and titrates 94.88 percent of dry substance with a total caffeine content of 5.5 percent calculated on the dry substance, of which 75 percent are in the combined form.

The 300-gram sediment is dissolved in 900 g of water heated to 50°C while stirring, then cooled while still stirring to 4°C. It is kept at this temperature for 1 hour, then atomized. Thus, 98.5 g of powder (denoted CTT) titrating 97.47 percent of dry substance are obtained, with a total caffeine content of 13.2 percent calculated on the dry material, of which 81 percent are in the combined form.

The balance of this operation is as follows:
Raw material: 10 kg of fresh kola nuts containing 87 grams of total caffeine.

| Production: | | | | | |
|---|---|---|---|---|---|
| Alcohol | | 602 c.c. | | | |
| 6.45% CTR | atomized product | 610 g | containing | 37.8 | g of caffeine |
| 5.5 % CTS | do. | 420 g | do. | 22 | g of caffeine |
| 13.2% CTT | atomized product | 98.5 g | containing | 12.5 | g of caffeine |
| Cake | | 6.250 g | do. | 8.1 | g do. |
| Uncontrolled losses | | | | 6.5 | g |
| | | | | 87.0 | g. |

EXAMPLE 2

1. 10 kg of fresh kola nuts containing 1.95 percent of total caffeine calculated on the dry substance corresponding to 45.82 percent are grated and immersed in 25 litres of wash water from a preceding operation, heated to 75°C. The mix is enzymated with 60 g of amylase from group B, and kept in contact therewith while stirring and preventing the temperature from dropping below 75°C, until the violet color obtained in the presence of iodine disappears. The enzymation operation takes about 15 minutes.

2. The mix is drained on a sieve and the volume of the filtrate thus collected is 21 litres titrating 11° Brix. The residual cake is pressed, and the total volume of the juice thus collected is 25.75 kg titrating 11° Brix. This residual cake is lixiviated in 25 litres of water at 50°C, then drained and pressed again. Thus, 24.2 litres of so-called "wash water from a preceding operation" are obtained at 2°2 Brix, together with 6.430 kg of cake titrating 72 percent of moisture and containing 0.51 percent of total caffeine calculated on the dry material.

3. The first-pressure juice is cooled while stirring to 55°C, then 25 g of citric acid are added to bring the pH value to 4.5 + 5.

These three steps are the same as in Example 1.

4. The mix is centrifugated. Thus, 25 kg of juice at 10°5 Brix, titrating 9.2 percent of dry substance and 3.44 percent of caffeine calculated on the dry substance, are obtained.

5. The extract thus obtained is concentrated to 23° Brix, corresponding to 28.38 percent of dry substance, to yield 12.5 kg of concentrate.

6. The product is cooled to 4°C and then allowed to rest during 1 hour at this temperature. The liquid is subsequently atomized. Thus, 2.140 g of powder (denoted CTP) titrating 97.28 percent of dry substance and containing 3.72 percent of caffeine in relation to the dry substance, of which 82 percent are in the combined form, are obtained.

The balance of this operation is as follows:
Raw material: 10 kg of fresh kola nuts containing 88.8 g of total caffeine Production:
| | | |
|---|---|---|
| 6/430 g of cake containing | 9.2 | g of caffeine |
| 3.72 % of atomized product containing | 77.5 | g of caffeine |
| uncontrolled losses | 2.1 | g |
| | 88.8 | g. |

What is claimed is:

1. A method for obtaining a stabilized fresh kola nut extract having a predetermined combined caffeine content, which comprises the steps of grating fresh kola nuts, mixing the grated kola nuts for about 15 minutes with wash water at a temperature of about 75°C while adding thereto a Group B amylase for starting saccharification, separating the mixture into a first-pressure juice and a cake, cooling said first pressure juice to 55°C and bringing the pH value of the first pressure juice to about 5, contacting said pressure juice with a Group F amylase, extracting solid substances from said juice, and maintaining the solid substance extract yeast thus obtained under vacuum for about 1 hour at a temperature of about 4°C wherein the temperature of the product does not exceed 50°C during the preceding operations.

2. The method of claim 1 which further includes the steps of lixiviating the cake at 50°C, separating the water produced during said lixiviation and storing this lixiviation water for a subsequent use as wash water during the next fresh kola nut grating operation.

3. The method of claim 1 wherein after contacting the pressure juice with the group F amylase the liquid is sown with yeast and subjected to an alcohol fermentation at a temperature of about 25°C for about 36 hours.

4. The method of claim 3 wherein after fermentation the liquid is filtered to remove the yeasts, the filtrate is distilled in vacuo to recover the alcohol, and concentrating in vacuo the alcohol until a dry extract is obtained.

* * * * *